US010263563B2

(12) United States Patent
Hsu et al.

(10) Patent No.: US 10,263,563 B2
(45) Date of Patent: Apr. 16, 2019

(54) MODULAR SOLAR POWER GENERATION APPARATUS

(71) Applicant: BEE SPACE CO., LTD., Taipei (TW)

(72) Inventors: Yi-Wen Hsu, Taipei (TW); Po-Chung Liu, New Taipei (TW); Chan-Yu Kuo, Taipei (TW)

(73) Assignee: BEE SPACE CO., LTD., Taipei (TW)

( * ) Notice: Subject to any disclaimer, the term of this patent is extended or adjusted under 35 U.S.C. 154(b) by 0 days.

(21) Appl. No.: 15/560,153

(22) PCT Filed: Dec. 10, 2015

(86) PCT No.: PCT/CN2015/096966
§ 371 (c)(1),
(2) Date: Sep. 20, 2017

(87) PCT Pub. No.: WO2017/096575
PCT Pub. Date: Jun. 15, 2017

(65) Prior Publication Data
US 2018/0278203 A1    Sep. 27, 2018

(51) Int. Cl.
| | | |
|---|---|---|
| H02S 40/22 | (2014.01) |
| H02S 30/00 | (2014.01) |
| H02S 30/10 | (2014.01) |
| H02S 40/36 | (2014.01) |
| H02S 40/42 | (2014.01) |
| H02S 50/00 | (2014.01) |

(52) U.S. Cl.
CPC .............. *H02S 40/22* (2014.12); *H02S 30/00* (2013.01); *H02S 30/10* (2014.12); *H02S 40/36* (2014.12); *H02S 40/425* (2014.12); *H02S 50/00* (2013.01); *Y02E 10/52* (2013.01)

(58) Field of Classification Search
CPC .......... H02S 30/00; H02S 30/10; H02S 40/20; H02S 40/22; H02S 40/36
See application file for complete search history.

(56) References Cited

FOREIGN PATENT DOCUMENTS

| | | |
|---|---|---|
| CN | 201278497 Y | 7/2009 |
| TW | M357587 U1 | 5/2009 |
| TW | M456587 U1 | 7/2013 |

*Primary Examiner* — Eli S Mekhlin
(74) *Attorney, Agent, or Firm* — Chun-Ming Shih

(57) ABSTRACT

The present disclosure relates to a modular solar power generation apparatus comprising a base plate, a light guiding unit, a plurality of connection units and a plurality of solar panels wherein: the light guiding unit is installed on the base plate; all connection units are circlewise mounted on the base plate and encircling the light guiding unit; each the solar panel, which is connected to one of the connection units, and the base plate form an angle of inclination by which each the solar panel features upward broadened widths such that any two neighboring solar panels allow their corresponding edges to be adjacent to each other and a gap in between to be narrowed for development of solar panels easily installed and maintained.

11 Claims, 6 Drawing Sheets

MODULAR SOLAR POWER GENERATION APPARATUS

The present application is based on PCT application number PCT/CN2015/096966, filed on Dec. 10, 2015, the disclosure of which is hereby incorporated by reference herein in its entirety.

BACKGROUND OF THE INVENTION

1. Field of the Invention

The present disclosure relates to a solar power generation apparatus, particularly a solar power generation apparatus which adjusts an incident angle of light and reflects light within the incident angle adjusted.

2. Description of the Prior Art

As an environment-friendly renewable energy generation method, solar power generation which features no production of greenhouse gases such as carbon dioxide does not pollute environment during power generation.

Moreover, a traditional solar panel is characteristic of a plurality of solar cells mounted on a sheet of base plate on which light rays (for example, sunlight) are projected for generation of electric energy from solar cells. However, a whole solar panel on which contiguous solar cells are integrated with one another for production of electric energy as required must be replaced completely for resurrection of the original power generating efficiency when a single solar cell on the solar panel fails and weakens power generating efficiency of a solar panel. Against this background, some manufacturers or researchers proposed several solutions, for example, "solar power light concentrator module", Chinese utility model patent CN201278497Y, concentrates sunlight on a single solar cell without the problem to replace a whole solar panel on which a solar cell fails.

However, the "solar power light concentrator module" on which a single solar cell is mounted produces insufficient electric energy. For production of electric energy as required, solar power assemblies should be installed on a large-scale flat area which is no easy feat for development and promotion of solar power generation. In this regard, other manufacturers or researchers further proposed several solutions, for example, either "spatial solar light concentrating device" (Taiwan utility model patent M357587) and "solar energy collector" (Taiwan utility model patent M456587) reflect or refract sunlight to all peripheral solar panels for installation of more traditionally planar solar panels with the same flat area and promotion of overall power generating efficiency.

However, some problems in the "spatial solar light concentrating device" and the "solar energy collector", each of which are installed and maintained inconveniently, still remain to be solved, for example, some gaps exist between solar panels assembled at an angle of inclination result in loss of some light sources.

SUMMARY OF THE INVENTION

In virtue of technical issues in the prior art, a solar power generation apparatus with the fewest gap between solar panels for convenient installation and maintenance is provided in the present disclosure to avoid the technical disadvantage.

The present disclosure is to offer a modular solar power generation apparatus which comprises of a base plate, a light guiding unit, a plurality of connection units and a plurality of solar panels wherein the light guiding unit is installed on the base plate, all connection units are mounted on the base plate and around the periphery of the light guiding unit, and each solar panel, which is connected to one of the connection units, and the base plate form an angle of inclination by which each solar panel features upward broadened widths such that any two neighboring solar panels allow their corresponding edges to be adjacent to each other and a gap in between to be narrowed for development of solar panels easily installed and maintained.

A modular solar power generation apparatus further comprises a shield which covers around the periphery of a modular solar power generation apparatus and has one end opposite to the base plate as well as the other end adjacent to top ends of solar panels. As such, solar panels are less susceptible to external collisions with a shield covering the solar panels peripherally.

In a modular solar power generation apparatus, a shield, which is provided with a plurality of first connecting portions and a plurality of second connecting portions peripherally, relies on the first connecting portions to link the second connecting portions on another shield and the second connecting portions to link the first connecting portions on a further shield for interconnections of multiple modular solar power generation subassemblies.

A modular solar power generation apparatus further comprise an extension portion coupled with the base plate, taken as a bridge from which electrical energy generated by each solar panel is accumulated through the base plate, and connected to an external unit which receives electric energy transmitted from the extension portion.

The present disclosure is to offer a modular solar power generation system comprising of a plurality of modular solar power generation subassemblies, each of which comprises a base plate, a light guiding unit, a plurality of connection units and a plurality of solar panels, wherein the light guiding unit is installed on the base plate; all connection units are circlewise mounted on the base plate and encircle the light guiding unit; each solar panel, which is connected to one of the connection units, and a base plate form an angle of inclination by which each solar panel features upward broadened widths such that any two neighboring solar panels allow their corresponding edges to be adjacent to each other; all base plates constitute a main plate; all modular solar power generation subassemblies are connected to one another for output of electric energy as required and a narrowed gap between any two neighboring solar panels for easy installation and maintenance.

A modular solar power generation system further comprises a frame which is assembled around the periphery of the modular solar power generation system and has one end opposite to the main plate as well as the other end adjacent to top ends of solar panels. As such, solar panels are less susceptible to damages induced by external collisions.

In a modular solar power generation system, a frame is equipped with a plurality of first joint parts and a plurality of second joint parts peripherally and relies on the first joint parts to link the second joint parts of a frame on another modular solar power generation system and the second joint parts to link the first joint parts of a frame on a further modular solar power generation system for interconnections of multiple modular solar power generation systems.

In a modular solar power generation system, solar panels in the same modular solar power generation apparatus are connected to a fault notification unit which sends a fault message when a solar panel fails.

In summary, a modular solar power generation apparatus has advantages as follows:
1. The gap between two solar panels is narrowed for convenient installation and maintenance of a solar panel.
2. Solar panels in a modular solar power generation apparatus or a modular solar power generation system are protected by a shield added peripherally.
3. A modular solar power generation apparatus which is connected to an external unit through an extension portion satisfies multi-purpose applications.
4. A damaged solar panel inside a modular solar power generation system can be easily detected by a fault notification unit.

BRIEF DESCRIPTION OF THE DRAWINGS

The technical content, purposes and effects of a modular solar power generation apparatus in the present disclosure is further explained in preferred embodiments and accompanying drawings which are shown as follows.

DETAILED DESCRIPTION OF THE PREFERRED EMBODIMENT

Figure 1:
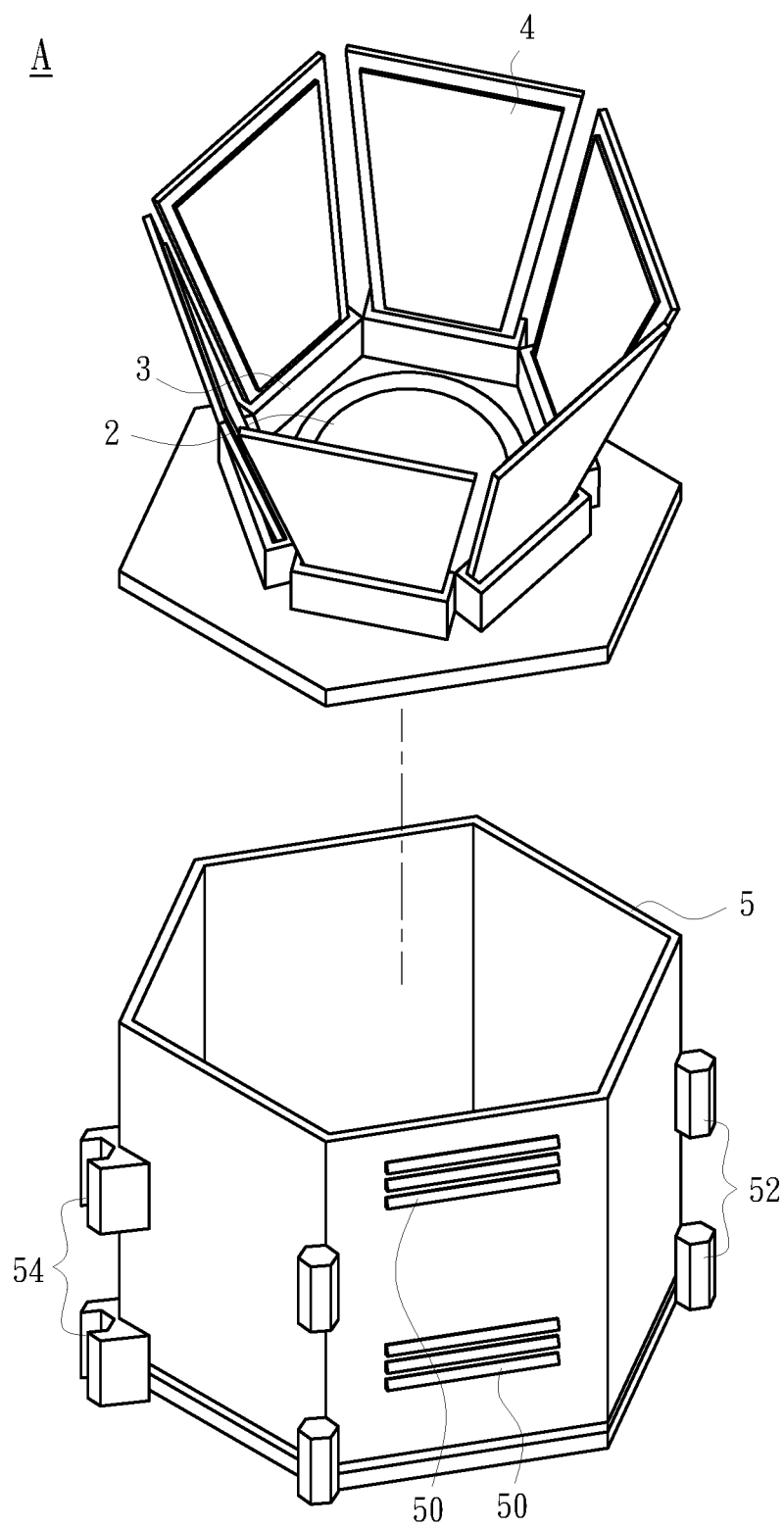
FIG. 1 is a schematic view of a modular solar power generation apparatus.

Referring to FIG. 1, which illustrates a modular solar power generation apparatus comprises a base plate 1, a light guiding unit 2, a plurality of connection units 3 and a plurality of solar panels 4; in a modular solar power generation apparatus, the light guiding unit 2, which is installed on the base plate 1, is a conical reflecting mirror or a circular-arc reflecting mirror or prism for adequate guidance of extraneous light rays along a preset path according to light refraction and reflection principles. All connection units 3 circlewise mounted on the base plate 1 and encircling the light guiding unit 2 can be contiguous gold finger printed circuit board (PCB) sockets.

Furthermore, each the solar panel 4 is connected to one of the connection units 3 and comprises a gold finger PCB which is plugged into the connection unit 3 for transmission of generated electric energy to the connection unit 3 and the base plate 1 sequentially from which the electric energy is transmitted outside as required. Each the solar panel 4 and the base plate 1 form an angle of inclination by which each the solar panel 4 features upward broadened widths such that any two neighboring solar panels 4 allow their corresponding edges to be adjacent to each other and a gap in between to be narrowed. As such, the solar panels 4, which are erected obliquely and get close to each other structurally, are able to receive and use light rays guided by the light guiding unit 2 sufficiently for good power generating efficiency of each the solar panel 4. Moreover, any the solar panel 4 which is to be spatially erected on the connection unit 3 is installed conveniently and disassembled for repair of any probable damage on the solar panel 4. Accordingly, a modular solar power generation apparatus expands its illuminated surface for effective power production, having the advantage of easy maintenance in the future.

The solar panels 4 which are spatially inserted into the connection unit 3 at an angle of inclination may collide easily. To prevent the solar panels 4 from damages induced by collisions, a modular solar power generation apparatus in the present disclosure further comprises a shield 5 that is erected around the periphery of the modular solar power generation apparatus and has one end opposite to the base plate 1 as well as the other end adjacent to the top ends of the solar panels 4 and becoming an opening from which extraneous light rays are projected on the light guiding unit 2 inside the shield 5. As such, the solar panels 4 are less susceptible to external collisions with the shield 5 covering the solar panels 4 peripherally.

To prevent elevated temperature on the solar panel 4 covered inside the shield 5, the shield 5 is provided with at least a ventilation section 50 at one side for ventilation between inside and outside of the shield 5.

Figure 2:
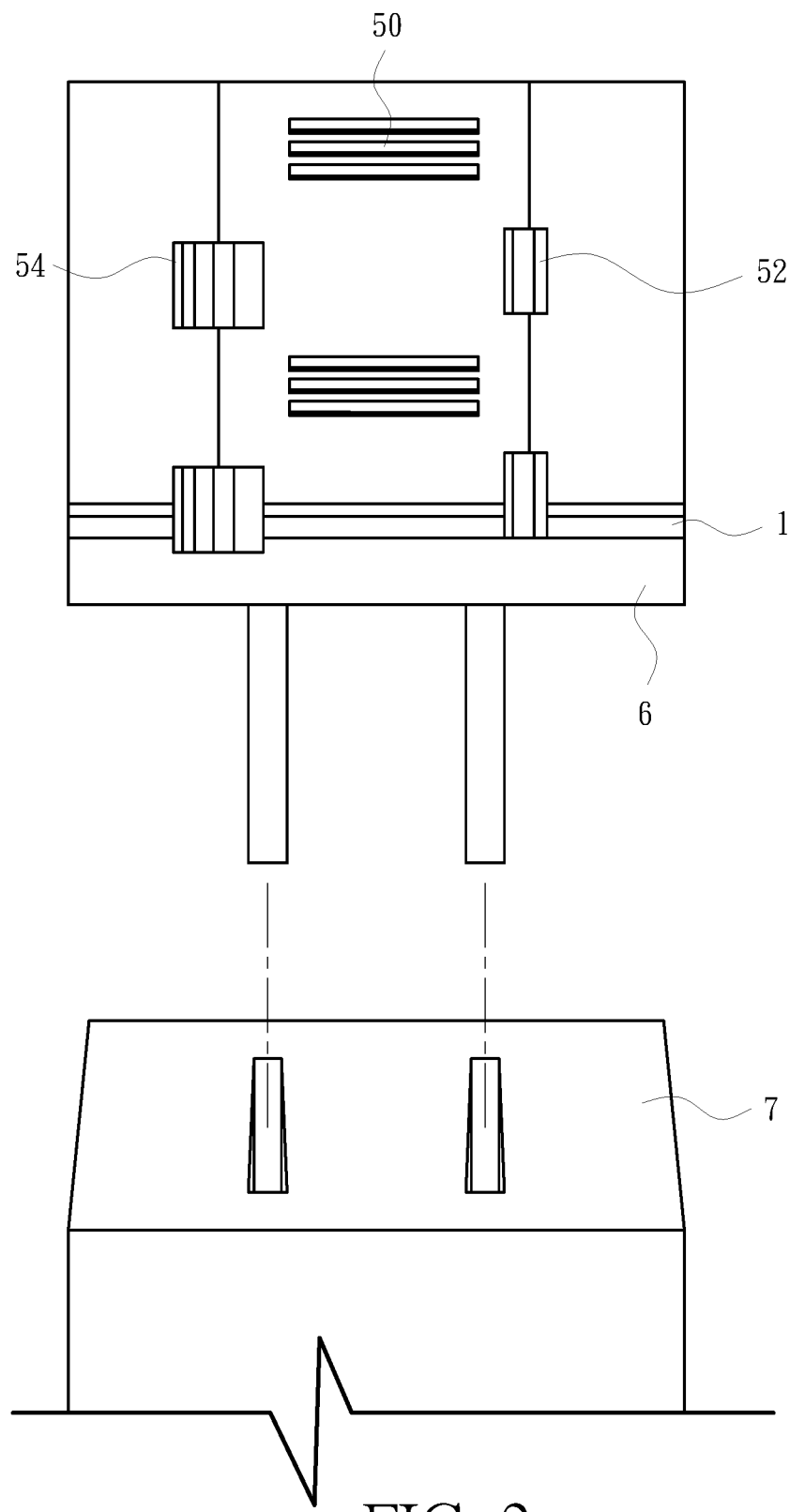
FIG. 2 is a schematic view of a modular solar power generation apparatus and an external unit.

In the present disclosure, a shield 5, which is provided with a plurality of first connecting portions 52 and a plurality of second connecting portions 54 peripherally, relies on the first connecting portions 52 to link the second connecting portions 54 on another the shield 5 and the second connecting portions 54 to link the first connecting portions 52 on a further shield 5 for interconnections of multiple modular solar power generation subassemblies. Furthermore, referring to FIG. 2, which illustrates a modular solar power generation apparatus further comprises an extension portion 6 coupled with the base plate 1, taken as a bridge from which electrical energy generated by each the solar panel 4 is accumulated through the base plate 1, and connected to an external unit 7, for example, a battery charger or an external USB power supply, which receives electric energy transmitted from the extension portion 6.

Referring to FIG. 1 for an embodiment of the present disclosure, which illustrates the light guiding unit 2 is equipped with six circlewise erected the solar panels 4 for development of a regular hexagon encircled at top ends of the six solar panels 4; however, a modular solar power generation apparatus which is not limited to a device with six solar panels 4 assembled in practice can be a polygonal device made of three or more solar panels 4 as claimed in claims herein. Moreover, a shield 5 with a regular hexagon exterior has six sides of the first connecting portion 52, the second connecting portion 54, the first connecting portion 52, the second connecting portion 54, the first connecting portion 52, and the second connecting portion 54 in order for convenient connections to other shields 5 with the same structure.

Figure 3:
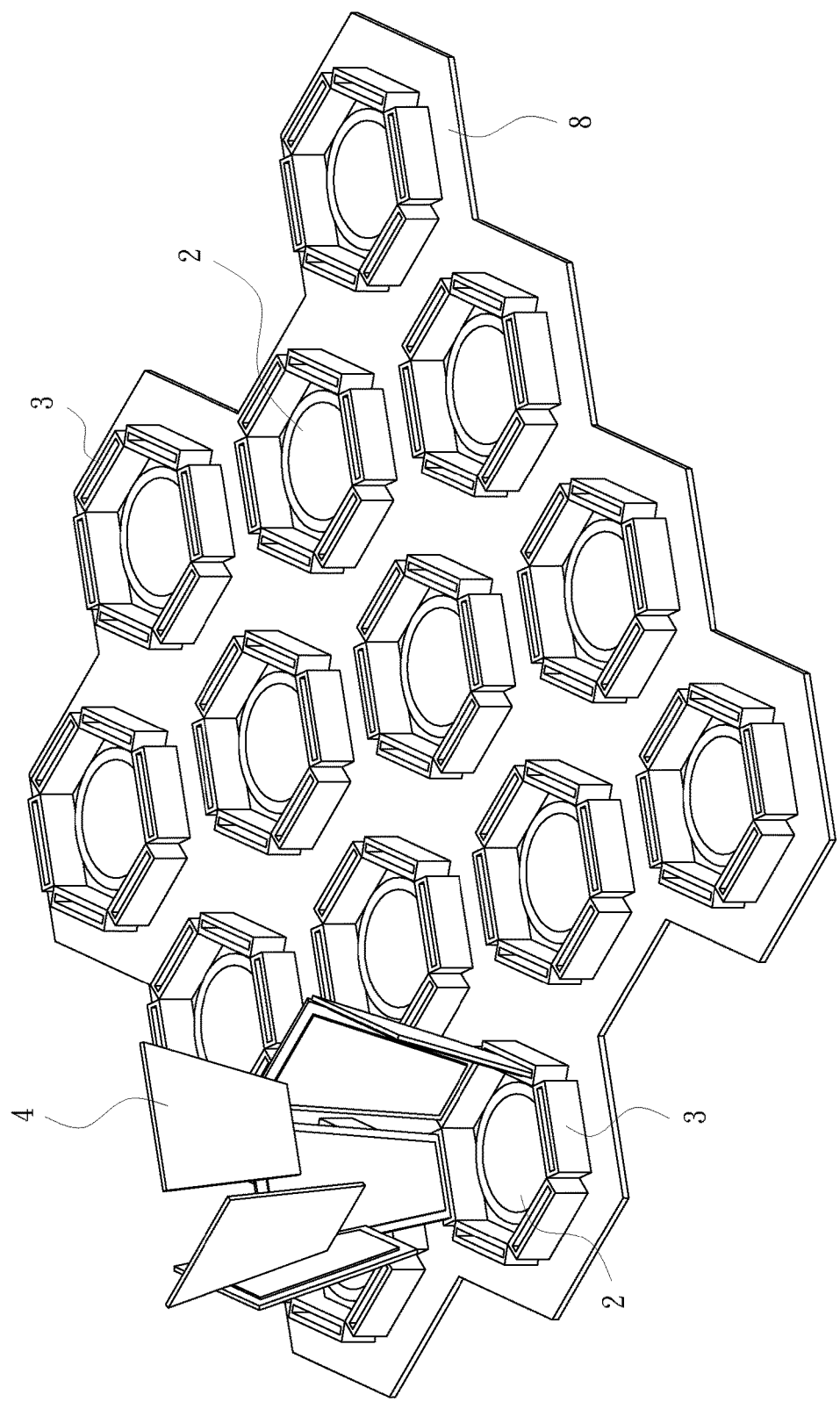
FIG. 3 is a schematic view of a modular solar power generation system.

Referring to FIG. 3, which illustrates a modular solar power generation system comprises a plurality of modular solar power generation subassemblies A that bear similarity to the modular solar power generation subassemblies previously mentioned and all base plates in FIG. 3 constitute a main plate 8 on which all modular solar power generation subassemblies A are connected to one another for output of electric energy as required. As such, any two neighboring solar panels 4 form a fewer gap in between for convenient installation and maintenance of a solar panel.

Figure 4:
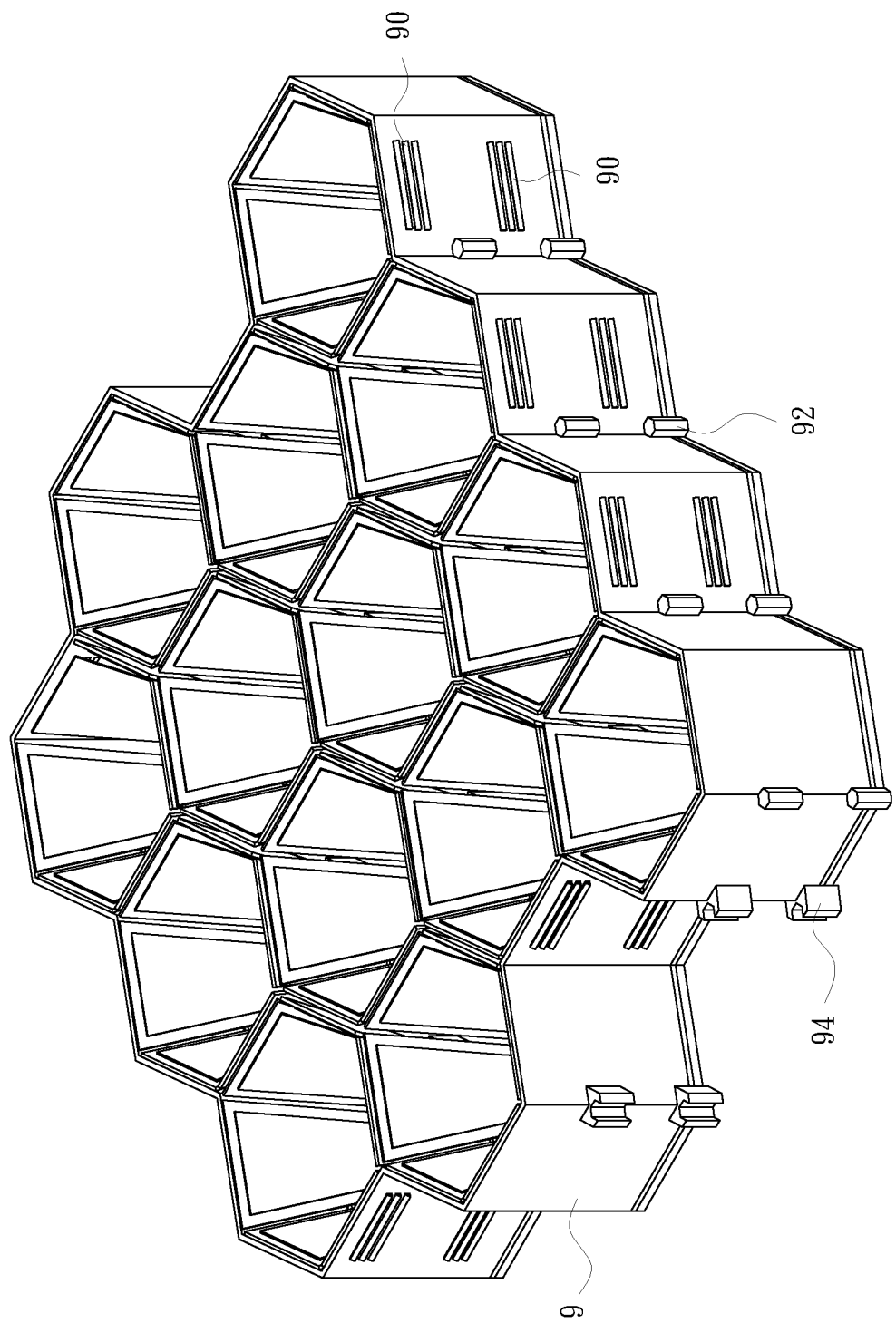
FIG. 4 is another schematic view of a modular solar power generation system.
Figure 5:
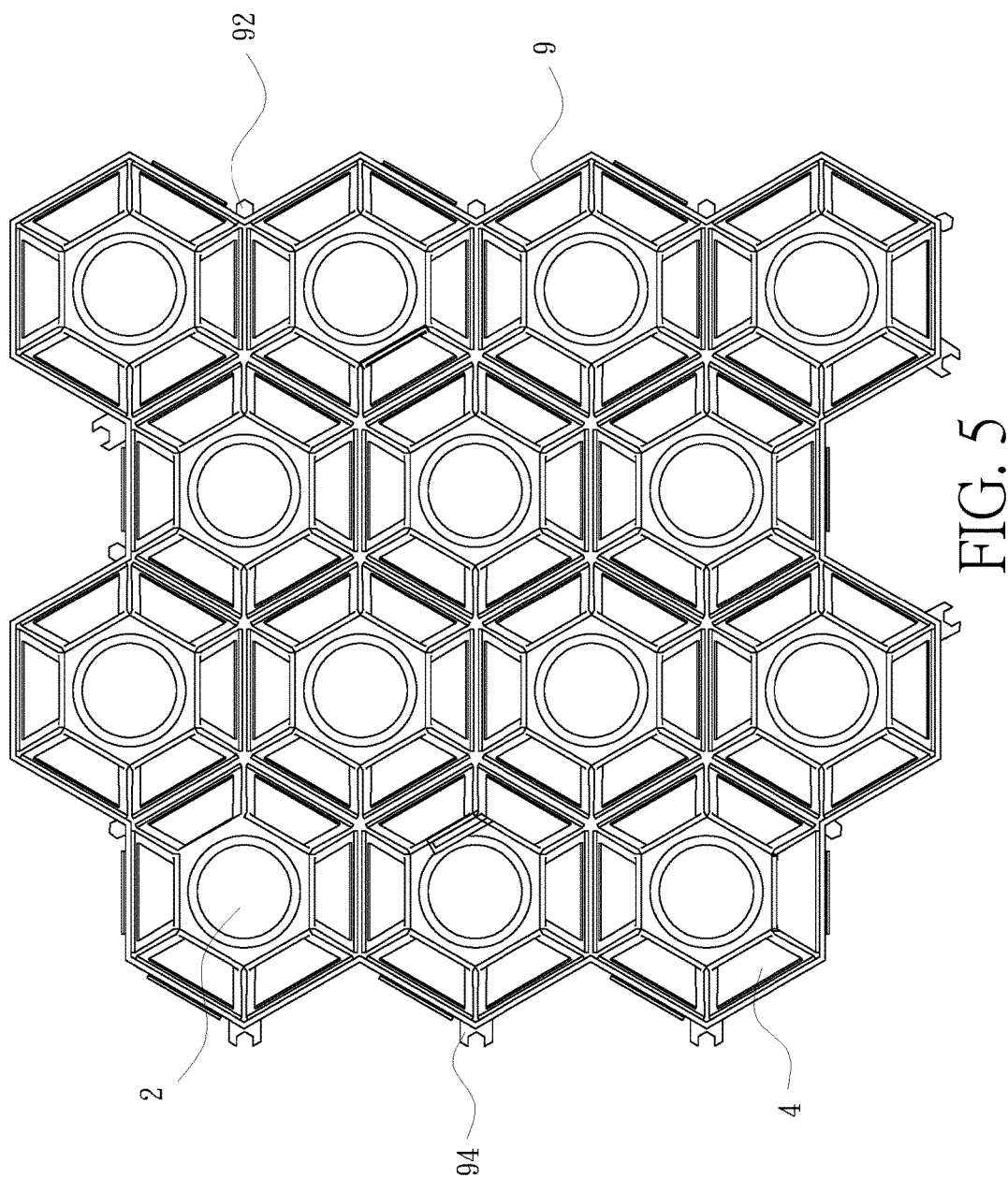
FIG. 5 is a top view of a modular solar power generation system in FIG. 4.

Referring to FIGS. 4 and 5, which illustrate a modular solar power generation system in the present disclosure further comprises a frame 9 which is assembled around the periphery of the modular solar power generation system and has one end opposite to the main plate 8 as well as the other end adjacent to top ends of solar panels 4 and becoming an opening from which extraneous light rays are projected on the light guiding units 2 inside the frame 9. As such, the solar panels 4 are less susceptible to damages induced by external collisions. Furthermore, to prevent elevated temperature on the solar panels 4 covered inside the frame 9, the frame 9 is provided with at least a ventilation section 90 laterally by which ventilation between inside and outside of the frame 9 is enhanced.

Referring to FIGS. 4 and 5, which illustrate the frame 9 is equipped with a plurality of first joint parts 92 and a plurality of second joint parts 94 peripherally and relies on the first joint parts 92 to link the second joint parts 94 of the frame 9 on another modular solar power generation system and the second joint parts 94 to link the first joint parts 92 of a frame on a further modular solar power generation system for interconnections of multiple modular solar power generation systems.

Figure 6:
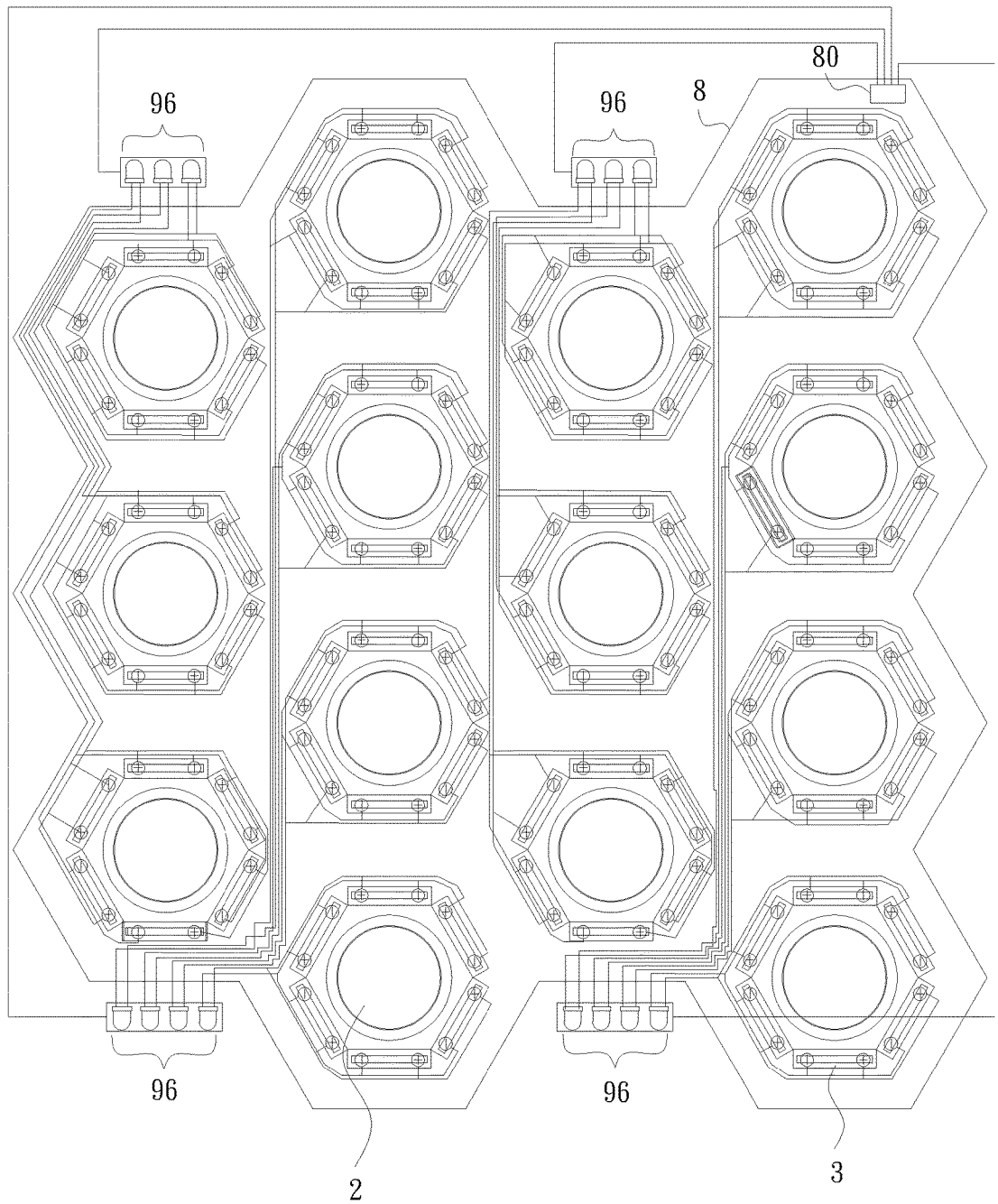
FIG. 6 is a schematic view for wiring of a modular solar power generation system.

A damaged solar panel should be checked and repaired by a technician conveniently. Referring to FIG. 6, which illustrates solar panels 4 of a modular solar power generation apparatus in a modular solar energy system are connected to a fault notification unit 96. As such, the fault notification unit 96, which can be a lamp (LED lamp or a tungsten bulb) or an acoustic generator (buzzer), will display or sound an alarm when any the solar panel 4 fails. Furthermore, the main plate 8 is equipped with a communications module 80 which is connected to the fault notification unit 96 and another remote monitoring system for reception of any fault message from the fault notification unit 96 and transmission of the fault message to a remote monitoring system through the communications module 80; the control room operator of the remote monitoring system will make a decision to repair any detected failure of the solar panel 4.

Referring to FIGS. 4, 5 and 6, which illustrate a modular solar power generation system consisting of regular hexagonal modular solar power generation subassemblies A in one embodiment comprises three modular solar power generation subassemblies A, four modular solar power generation subassemblies A, three modular solar power generation subassemblies A and four modular solar power generation subassemblies A in order. However, the present disclosure is not limited to the modular solar power generation system previously mentioned in practice. The solar panels 4 inside a modular solar power generation apparatus A are connected to an LED lamp in parallel. As such, any damaged solar panel 4, which is detected in a modular solar power generation apparatus A through an unlit LED lamp, can be replaced by a technician directly.

In the above embodiment, the frame 9 encircling a whole modular solar power generation system peripherally is equipped with the plurality of first joint parts 92 and the plurality of second joint parts 94 at two opposite sides, respectively; another the frame 9 is also equipped with the plurality of first joint parts 92 and the plurality of second joint parts 94 at two opposite sides, respectively. As such, multiple modular solar power generation systems are connected to one another.

In summary, solar panels almost dispense with gaps in between for taking full advantage of light rays guided by the light guiding units and satisfying good power generating efficiency. Moreover, the outer shield or frame prevents the solar panel from damage; the modular solar power generation apparatus connected to another the external unit through the extension portion is more applicable. Additionally, the damaged solar panel which is detected with the fault notification unit is maintained conveniently.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A modular solar power generation apparatus, comprising:
   a base plate;
   a light guiding unit installed on the base plate and guiding incident light rays along a preset path;
   a plurality of connection units circlewise mounted on the base plate and encircling the light guiding unit; and
   a plurality of solar panels, each of which is connected to one of the connection units, wherein each of the solar panels plugged into the connection unit transmits generated electric energy to the connection unit and further to the base plate from which the electric energy is delivered outward as required; each of the solar panels and the base plate form an angle of inclination by which each of the solar panels features upward broadened widths such that any two neighboring solar panels allow their corresponding edges to be adjacent to each other and a gap in between to be narrowed.

2. The modular solar power generation apparatus as claimed in claim 1, further comprising: a shield which covers around the periphery of a modular solar power generation apparatus and has one end opposite to the base plate as well as the other end adjacent to top ends of the solar panels and becoming an opening from which the incident light rays are projected on the light guiding unit inside the shield.

3. The modular solar power generation apparatus as claimed in claim 2 wherein the shield is provided with at least a ventilation section at one side.

4. The modular solar power generation apparatus as claimed in claim 2 wherein the shield, which is provided with a plurality of first connecting portions and a plurality of second connecting portions peripherally, relies on the first connecting portions to link a plurality of second connecting portions on shield of another modular solar power generation apparatus, respectively, and the second connecting portions to link a plurality of first connecting portions on a shield of a further modular solar power generation apparatus, respectively.

5. The modular solar power generation apparatus as claimed in claim 1, further comprising: an extension portion coupled with the base plate, taken as a bridge from which the electrical energy generated by each of the solar panels is accumulated through the base plate, and connected to an external unit.

6. A modular solar power generation system comprising a plurality of modular solar power generation apparatuses, each modular solar power generation apparatus comprising:
   a base plate;
   a light guiding unit installed on the base plate and guiding incident light rays along a preset path;
   a plurality of connection units circlewise mounted on the base plate and encircling the light guiding unit; and
   a plurality of solar panels, each of which is connected to one of the connection units, wherein each of the solar panels plugged into the connection unit transmits generated electric energy to the connection unit and further to the base plate from which the electric energy is delivered outward as required; each of the solar panels and the base plate form an angle of inclination by which each of the solar panels features upward broadened widths such that any two neighboring solar panels allow their corresponding edges to be adjacent to each other and a gap in between to be narrowed, wherein all the base plates constitute a main plate and the modular solar power generation apparatuses are connected to each other.

7. The modular solar power generation system as claimed in claim 6, further comprising: a frame which is assembled around the periphery of modular solar power generation system and has one end opposite to the main plate as well as the other end adjacent to top ends of the solar panels and becoming an opening from which the incident light rays are projected on the light guiding units inside the frame.

8. The modular solar power generation system as claimed in claim 7 wherein the frame, which is equipped with a plurality of first joint parts and a plurality of second joint parts peripherally, relies on the first joint parts to link a plurality of second joint parts of a frame on another modular solar power generation system and the second joint parts to link a plurality of first joint parts of a frame on a further modular solar power generation system.

9. The modular solar power generation system as claimed in claim 7 wherein the frame is provided with at least a ventilation section at one side.

10. The modular solar power generation system as claimed in claim 6 wherein all solar panels in the modular solar power generation apparatuses are connected to a fault notification unit.

11. The modular solar power generation system as claimed in claim 10 wherein the main plate is provided with a communications module connected to the fault notification unit and further a remote monitoring system for reception of any fault message from the fault notification unit and transmission of the fault message to a remote monitoring system through the communications module.

* * * * *